United States Patent [19]

Chiu

[11] Patent Number: 5,407,219
[45] Date of Patent: Apr. 18, 1995

[54] TRAILER HITCH BALL COVER WITH INTEGRAL TRAILER WIRING CONNECTOR

[76] Inventor: Donald W. Chiu, 7118 Treewater, Houston, Tex. 77072

[21] Appl. No.: 89,285

[22] Filed: Jul. 8, 1993

[51] Int. Cl.⁶ ............................................. B60D 1/62
[52] U.S. Cl. .................................. 280/422; 280/507; 280/511; 439/35
[58] Field of Search ............... 280/507, 422, 511, 420, 280/491.2, 491.5; 191/11, 52, 72; 70/237, 238, 239; 439/34, 35, 36, 528, 529, 574, 575; 150/154, 166, 901; D12/162

[56] References Cited

U.S. PATENT DOCUMENTS

| | | | |
|---|---|---|---|
| 3,228,445 | 1/1966 | Mayotte | 280/507 |
| 3,328,741 | 6/1967 | Brown | 280/422 |
| 3,473,826 | 10/1969 | Elliott | 280/422 |
| 3,596,926 | 8/1971 | Randall | 280/507 |
| 3,858,907 | 1/1975 | Van Raden | 280/422 |
| 4,040,641 | 8/1977 | Riecke | 280/507 |
| 4,842,524 | 6/1989 | Hopkins et al. | 439/35 |
| 4,861,062 | 8/1989 | Stidsen | 280/507 |
| 5,037,122 | 8/1991 | Beckerer | 280/507 |
| 5,129,828 | 7/1992 | Bass | 439/35 |

FOREIGN PATENT DOCUMENTS

| | | | |
|---|---|---|---|
| 0582942 | 9/1932 | Germany | 280/511 |
| 3341705 | 5/1985 | Germany | 280/511 |
| 1455123 | 11/1976 | United Kingdom | 280/420 |

Primary Examiner—Margaret A. Focarino
Assistant Examiner—Anne Marie Boehler
Attorney, Agent, or Firm—Gunn & Kuffner

[57] ABSTRACT

An cover for protecting a trailer hitch ball or box beam comprises a resilient body having a wiring connector and wiring cable integrally formed therewith. Moisture, dirt and physical damage of the trailer hitch ball is minimized through use of the protective cover.

12 Claims, 2 Drawing Sheets

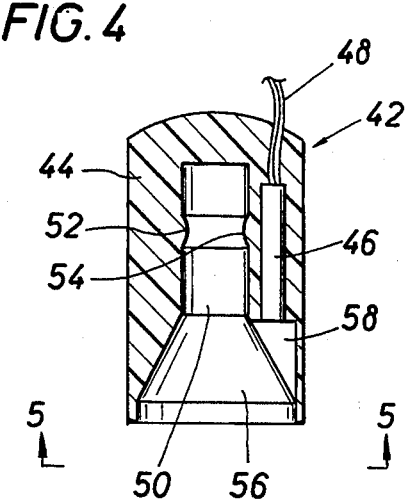
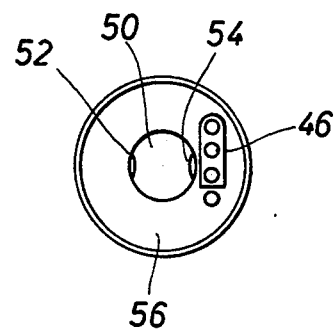
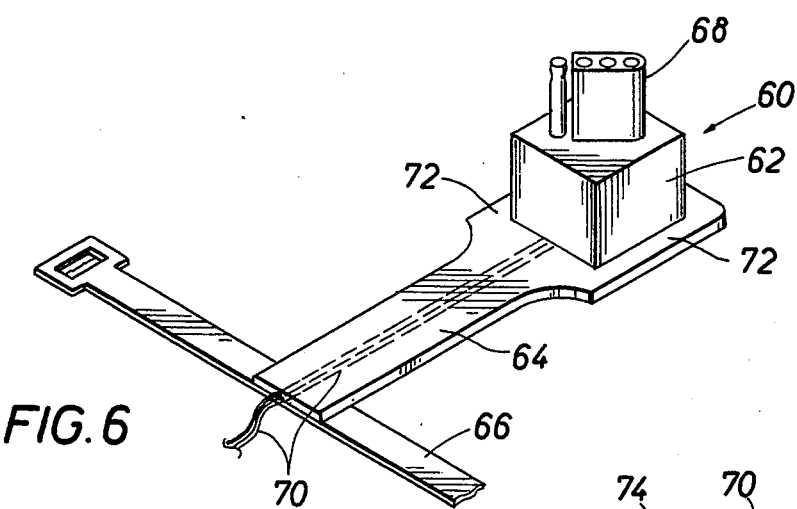
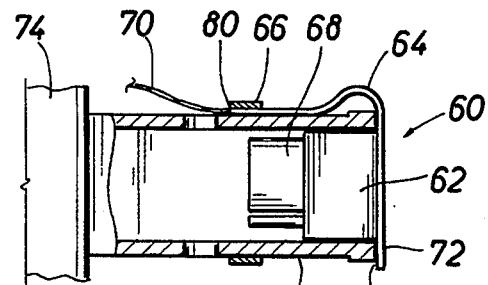
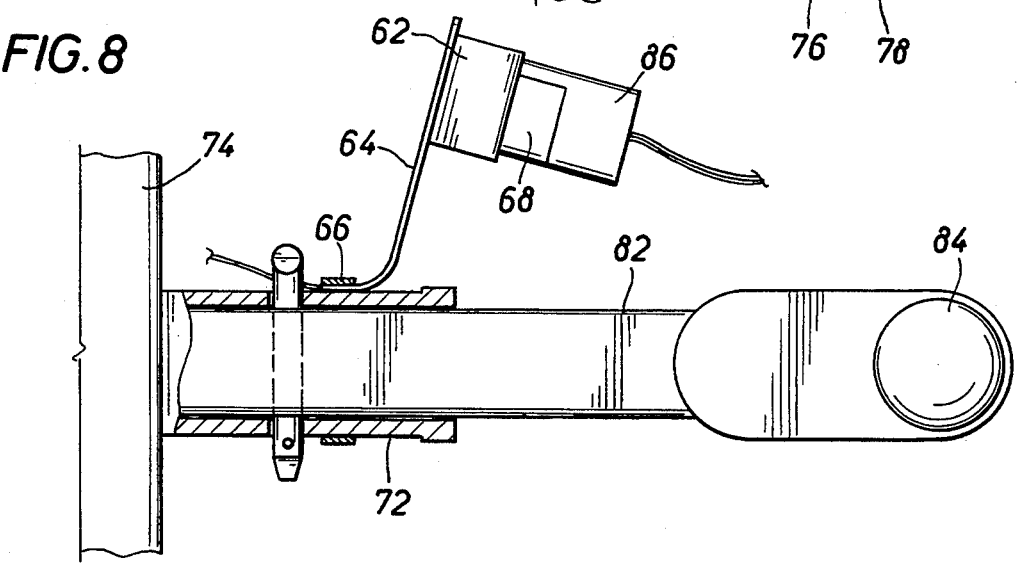

TRAILER HITCH BALL COVER WITH INTEGRAL TRAILER WIRING CONNECTOR

BACKGROUND OF THE INVENTION

A trailer hitch usually comprises a sphere or ball portion supported at its lower portion by an upright stem from a framework connected to a towing vehicle. The ball portion acts as the connecting member between the vehicle and the trailer and functions as a bearing surface as the trailer pivots with respect to the towing vehicle. When not in use, the ball portion of a trailer hitch is normally exposed at the rear of the vehicle in a position such that it gathers dirt and becomes rusty so that it eventually fails to provide a proper bearing surface for the trailer.

In the past, it has usually been necessary for the owner of a trailer to frequently clean and lubricate the ball portion of the trailer hitch before attaching a trailer thereto. In order to perform this function, the owner must maintain materials at hand to perform the cleaning function, such as an abrasive material and a lubricant, and spend time performing the cleaning and lubricating steps. Of course, this is inconvenient, troublesome and time consuming.

Ball covers have been developed that attempt to protect the hitching device from the elements. However, many of these covers have proven to be less than satisfactory. For instance, the ball cover may come off and be lost or become misplaced between periods of use. If the cover cannot be found easily in the proximity of the ball when it is needed, it will not be effective to prevent damage. If the ball cover is designed improperly, it can become a trap for dirt and water, therefore accelerating the deterioration of the ball or other hitching mechanism.

In addition, the cable and connector used to communicate brake and turn signals from the towing vehicle to the trailer is usually left to hang from the rear of the vehicle when not in use. This can result in damage caused by a buildup of dirt, grease and water, impact with road objects, and dragging along the pavement. Some users will place the connector into the trunk of a car such that the cable is pinched when the trunk is closed. This may cause more damage to the cable than if it were left dangling from the trailer hitch. Also, many trailer hitch balls are mounted on trucks which do not typically have a trunk in which to store and protect the connector and cable.

U.S. Pat. No. 3,228,455 (Mayotte) discloses a trailer hitch ball cover that fits over the trailer hitch ball and is provided with a tab having a hole for attaching the ball cover to the towing vehicle. U.S. Pat. No. 3,596,926 (Randall) discloses a trailer hitch cover which includes a soft absorbent material which is wedged about the ball for the purpose of keeping the ball greased. A chain attaches the cover to the framework of the trailer hitch. There is also a closure cap which encloses the threaded bottom end of the shaft.

U.S. Pat. No. 4,842,524 (Hopkins, et al.) discloses a trailer light connection system. U.S. Pat. No. 4,861,062 (Stidsen) discloses a trailer hitch ball cover which comprises two semi-spherical shells pivotally fastened to the hitch rod below the trailer ball. The shells pivotally converge to enclose the trailer hitch ball when it is not in use. This arrangement can actually trap moisture against the ball and cause rust. It can also get in the way of the trailer hitch.

While the trailer ball covers of the prior art each suffer their own unique problems, none of these patents address the problem of protecting trailer brake and signal light connectors. The apparatus of the present disclosure overcomes the deficiencies of the prior art covers by providing an apparatus which securely holds the protective cover to the trailer hitch ball or box beam, incorporates the wiring connector for the trailer's brake and signal lights to prevent damage to the connector, and is attached to the vehicle to prevent misplacement of the cover.

It is therefore an object of the invention to provide an apparatus for protecting a trailer hitch ball, box beam or the equivalent thereof from moisture, dirt and scratching.

It is another object of the invention to provide an apparatus which secures and protects the wiring connector from direct exposure to moisture, dirt and physical damage.

It is another object of the invention to provide an apparatus which will not rust, and require permanent installation or attachment to the trailer ball or box beam.

It is yet another object of the invention to provide an apparatus which eliminates misplacement of the ball cover between uses. Furthermore, the ball cover is stored in a way that it is not damaged or is not in the way of the vehicle operator.

SUMMARY OF THE INVENTION

According to one embodiment of the invention, the trailer hitch ball cover comprises a resilient cover which incorporates a trailer brake and signal light wiring connector. The substantially hollow cylindrical cover fits tightly over the trailer hitch ball. The wiring connector is integrally formed with the cover and is protected from damage. When the wiring connector is connected to the trailer, the ball cover remains attached to the wiring cable and cannot be misplaced or damaged.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a sectional view of an alternate embodiment of the invention for use with a post-type convertible ball type system;

FIG. 5 is a bottom view of the hitch ball cover shown in FIG. 4;

FIG. 6 is a perspective view of an embodiment of the trailer hitch cover of the invention for use with a box beam trailer hitch; and FIG. 7 is an elevational, partial sectional view of the trailer hitch ball cover shown in FIG. 6 inserted in a box beam of the trailer hitch; and FIG. 8 is an elevational, partial sectional view of the trailer hitch cover shown in FIG. 7 depicting the wiring connector attached to the trailer brake and signal light connector.

DETAILED DESCRIPTION OF THE PREFERRED EMBODIMENT

Figure 1:
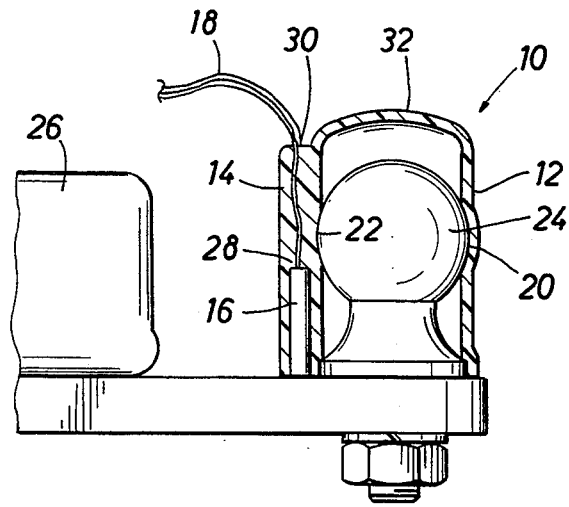
FIG. 1 is a sectional view of the trailer hitch ball cover of the invention.

Referring first to FIG. 1, the trailer hitch ball cover of the invention is generally identified by the reference numeral 10. As shown in FIG. 1, the cover 10 comprises a body 12, an enlarged wall portion 14, a wiring connector 16, and a strain reinforced cable 18. In FIG. 1, trailer hitch ball cover 10 is shown mounted about a trailer hitch ball 24. The inside diameter of the substantially hollow cylindrical body 12 is less than the diameter of the ball 24 so that the body 12 fits snugly around the ball 24. The end 32 of the body 12 is closed, thereby preventing rain and dirt from contacting and/or collecting around the trailer hitch ball 24. This protection reduces the amount of scratching and rust which the ball 24 is exposed to.

The wiring connector 16 is integrally formed within the enlarged wall portion 14 of the body 12. The enlarged wall 14, as shown in FIG. 1, is turned toward the vehicle bumper 26 to avoid accidental bumping or crushing of the wiring connector 16 housed within the body 12. It is understood, however, that the cover 10 may be oriented with the wall portion 14 facing any direction, but it is preferred that it be turned toward the bumper 26 to provide maximum protection for the wiring connector 16.

The cable 18 extends upward from the connection point 28, where cable 18 is electrically connected to the wiring connector 16. Cable 18 extends through the enlarged wall portion 14 and exits the cover 10 at point 30. Cable 18 typically contains multiple conductor wires which carry signals to wiring connector 16. The distal end of cable 18 (not shown in the drawings) is connected to the electrical system of the vehicle.

Figure 2:
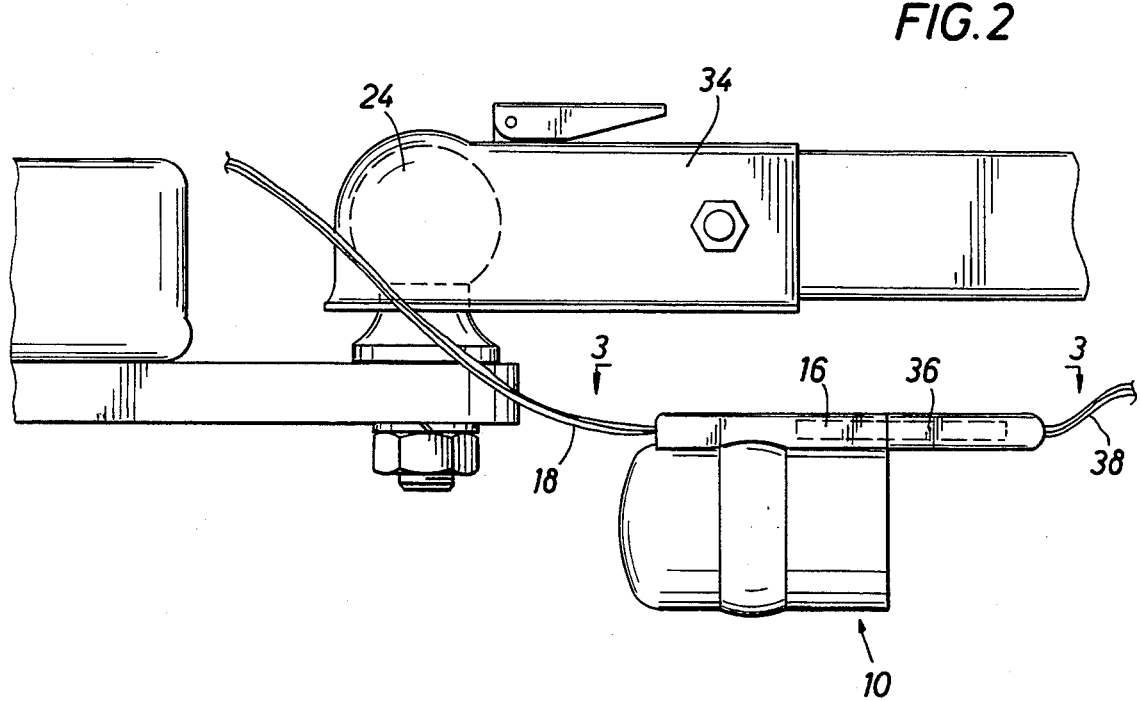
FIG. 2 is an elevational side view of the trailer hitch ball cover shown in use connected to the trailer brake and signal light connector.

Referring now to FIG. 2, the cover 10 is removed and the ball 24 is connected to a trailer hitch 34 for pulling a trailer. The wiring connector 16 is secured to a mating trailer connector 36 so that brake and turn signals may be relayed from the vehicle to the trailer tail lights. The cover 10 hangs between cables 18 and 38 when connectors 16 and 36 are joined. Consistent and effective use of the cover 10 is possible because the cover 10 is attached to the vehicle by the cable 18 and is therefore in the proximity of the ball 24 at all times and will not be misplaced or lost between uses.

Figure 3:
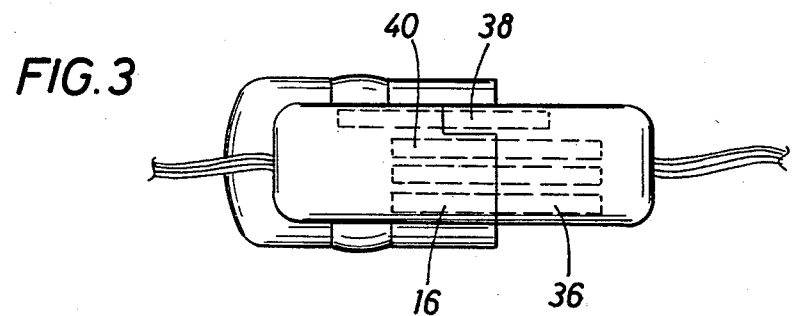
FIG. 3, is a top plan view of the hitch ball cover of the invention shown connected to the trailer wiring connector.

Referring now to FIG. 3, a top view of the ball cover 10 is shown. The wiring connector 16 is joined to the trailer wiring connector 36. The wiring connector 16 comprises a male terminal 38 and a female terminal 40. The trailer wiring connector 36 has mating terminals as required.

An alternate embodiment of the present invention is shown in FIG. 4. The trailer hitch ball cover shown in FIG. 4 is particularly suitable for use with convertible ball type systems that utilize a common post from which various sizes of trailer hitch balls 24 may be attached. The balls 24 may be stored in protective containers elsewhere, but the trailer hitch post remains attached to the vehicle. The cover 42, shown in FIG. 4 comprises a body 44, a wiring connector 46, and a strain reinforced cable 48. The body 44 includes substantially a cylindrical axial post receptacle 50. The axial receptacle 50 is sized to fit over and frictionally engage the upstanding post of a convertible ball type system. The receptacle 50 is provided with an internal circumferential ridge 52 which tightly grips around the post. A narrowing conical opening 56 to the receptacle 50 enables the user to easily position the cover 42 onto the post thereby protecting the post from the elements.

The wiring connector 46 is formed in one side of body 44. A recess 58 allows access to the connector 46 for the trailer wiring connector (not shown) to be joined when a trailer is being pulled. The cable 48 extends upward and through the body 44, the distal end thereof being connected to the vehicle electrical system.

Referring now to FIG. 5, the internal ridge 52 is more clearly shown forming the restriction in the receptacle 50 frictionally gripping the post, and thereby retaining the cover 42 securely about the post. Wiring connector 46 is shown to be easily accessible for connection with a trailer wiring connector.

Referring next to FIG. 6, the trailer hitch ball cover 60 comprises a square plug 62, a hinge 64, a tie-wrap type fastener 66, a wiring connector 68, a strain reinforced cable 70, and a flange cover 72. The wiring connector cable 70 extends through the plug 62 and out the hinge 64. The plug 62 is substantially centered on and projects from the flange cover 72.

The resilient plug 62 fits firmly within the trailer hitch box beam 76, as best shown in FIG. 7. In this position, the wiring connector 68 extends into the box beam 76 and is protected from physical damage, dirt and moisture. The flange cover 72 is attached to the backside of the plug 62, opposite the wiring connector 68. The flange cover 72 seals the end of the box beam 76 to prevent dirt and moisture from entering the box beam 76. The flange cover 72 extends outward beyond the periphery of the box beam 76 as shown at 78, providing a convenient means to grab and remove the plug 62 from the box beam 76.

The tie-wrap type fastener 66 is secured around the outside of the box beam 72 in a location where the hinge 64 can gently curve around the end of the box beam 76 when the plug 62 is inserted. The cable 70 extends out of the hinge 64 at 80.

Referring now to FIG. 8, the embodiment of the invention shown in FIG. 6 and FIG. 7 is shown in use. A trailer hitch box beam 82 and ball 84 are installed for pulling a trailer. The plug 62 has been withdrawn from the box beam 72 but remains attached thereto by the hinge 64 and fastener 66. Wiring connector 68 has been joined with a trailer wiring connector 86 for relay of brake and turn signals from the vehicle to the trailer.

It will be understood that certain combinations and subcombinations of the invention are of utility and may be employed without reference to other features in subcombinations. This is contemplated by and is within the scope of the present invention. As many possible embodiments may be made of this invention without departing from the spirit and scope thereof, it is to be understood that all matters hereinabove set forth or shown in the accompanying drawing are to be interpreted as illustrative and not in a limiting sense.

While the foregoing is directed to the preferred embodiment, the scope thereof is determined by the claims which follow:

What is claimed is:

1. A cover for a trailer hitch, comprising:
   (a) a removable resilient body held securely in place by frictional fit with a trailer hitch;
   (b) a wiring connector formed integrally with said body, said wiring connector having a plurality of terminals for coupling said wiring connector to a source of electrical signals; and
   (c) a wiring cable connected to the terminals and extending through said body:
   wherein the connector is capable of coupling to the source of electrical signals when said body is removed from the hitch.

2. The cover of claim 1 wherein said resilient body defines a substantially hollow cylinder having an enclosed upper end and an open lower end.

3. The cover of claim 2 wherein said body includes an enlarged portion defining a concave recess which mates with a trailer hitch ball for holding said cover securely in position about the trailer hitch ball.

4. The cover of claim 2 wherein said body includes an internal circumferential ridge for gripping engagement with an upstanding trailer hitch ball post.

5. The cover of claim 1 wherein said resilient body defines a plug.

6. The cover of claim 5 wherein said plug is tapered.

7. A cover for a trailer hitch ball, comprising:
   (a) a substantially hollow cylindrical body having an enclosed upper end and an open lower end, wherein the inside diameter of said cylindrical body is slightly smaller than the diameter of trailer hitch ball;
   (b) an enlarged wall portion formed integrally with said cylindrical body;
   (c) a wiring connector held securely within said enlarged wall portion; and
   (d) a wiring cable connected to said wiring connector, wherein said wiring cable extends upward through the enlarged wall of said cylindrical body.

8. The cover of claim 7 wherein said cylindrical body includes a concave circumferential recess which mates with the trailer hitch ball for holding said cover securely in position about the trailer hitch ball.

9. A cover for a trailer hitch convertible ball post, comprising:
   (a) a cylindrical body defining an axial receptacle extending from a lower end of said cylindrical body and terminating at an upper closed end thereof for removably coupling said cylindrical body to a trailer hitch convertible ball post;
   (b) a wiring connector securely positioned within the said cylindrical body for coupling the connector to a source of electrical signals; and
   (c) a wiring cable connected to said wiring connector, wherein said wiring cable extends upward through said cylindrical body and wherein the connector is capable of coupling to the source of electrical signals when said body is removed from the post.

10. The cover of claim 9, wherein said cylindrical body includes an internal circumferential convex ridge for frictional engagement with the convertible ball post.

11. The cover of claim 9, wherein the lower end of said axial receptacle defines a conical inwardly tapering surface.

12. The cover of claim 11, further including a recess in said conical tapering surface for providing access to said wiring connector.

* * * * *